US012683181B2

(12) United States Patent
Ishikawa et al.

(10) Patent No.: US 12,683,181 B2
(45) Date of Patent: Jul. 14, 2026

(54) FUEL CELL MODULE

(71) Applicant: TOYOTA JIDOSHA KABUSHIKI KAISHA, Toyota (JP)

(72) Inventors: Daisuke Ishikawa, Seto (JP); Shuji Kawamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 668 days.

(21) Appl. No.: 18/055,875

(22) Filed: Nov. 16, 2022

(65) Prior Publication Data

US 2023/0238561 A1 Jul. 27, 2023

(30) Foreign Application Priority Data

Jan. 21, 2022 (JP) ................................. 2022-008042

(51) Int. Cl.
*H01M 8/2475* (2016.01)
*H01M 8/2485* (2016.01)

(52) U.S. Cl.
CPC ....... *H01M 8/2485* (2013.01); *H01M 8/2475* (2013.01)

(58) Field of Classification Search
CPC ........................... H01M 8/2485; H01M 8/2475
See application file for complete search history.

(56) References Cited

U.S. PATENT DOCUMENTS

| | | | | |
|---|---|---|---|---|
| 2003/0037974 A1* | 2/2003 | Chernoff | .................. | B62D 5/00 |
| | | | | 180/65.265 |
| 2003/0235727 A1* | 12/2003 | Noetzel | ............ | H01M 8/04776 |
| | | | | 429/425 |
| 2005/0019643 A1* | 1/2005 | Sugita | ................... | H01M 8/248 |
| | | | | 429/470 |
| 2014/0322626 A1* | 10/2014 | Naito | .................... | H01M 8/248 |
| | | | | 429/467 |

FOREIGN PATENT DOCUMENTS

| | | |
|---|---|---|
| CN | 104124465 A | 10/2014 |
| CN | 113442743 A | 9/2021 |
| CN | 214588939 U | 11/2021 |
| JP | 2005-079002 A | 3/2005 |
| JP | 2015082478 A | 4/2015 |

* cited by examiner

*Primary Examiner* — Osei K Amponsah
(74) *Attorney, Agent, or Firm* — SoraIP, Inc.

(57) ABSTRACT

A fuel cell module includes a fuel cell stack, and a container that has a frame structure in which a polyhedron is composed of a plurality of main beams, and houses the fuel cell stack. The container has a vertical length and a horizontal length different from each other in side view. At least one main beam among the main beams includes a plurality of fastening points that are arranged along a longitudinal direction of the at least one main beam.

20 Claims, 9 Drawing Sheets

FUEL CELL MODULE

CROSS-REFERENCE TO RELATED APPLICATION

This application claims priority to Japanese Patent Application No. 2022-008042 filed on Jan. 21, 2022, incorporated herein by reference in its entirety.

BACKGROUND

1. Technical Field

The present disclosure relates to a fuel cell module.

2. Description of Related Art

For example, a fuel cell module is disclosed in Japanese Unexamined Patent Application Publication No. 2015-082478 (JP 2015-082478 A). In the fuel cell module, a fuel cell stack and a device needed for operating the fuel cell stack are housed in a container. The container has a frame structure composed of a plurality of beams. An object of a technique that is provided by JP 2015-082478 A is (1) to improve the utilization efficiency of a storage place, and (2) to enable easily fixing to an appliance even though a package is not unpacked.

SUMMARY

The fuel cell module is housed in a structure, such as an automobile, and is used as a power supply of an electric device in the structure. The present disclosure provides a fuel cell module that is easily fixed to the structure.

The present disclosure relates to a fuel cell module. The fuel cell module includes a fuel cell stack, and a container. The container has a frame structure in which a polyhedron is composed of a plurality of main beams, and houses the fuel cell stack. The container has a vertical length and a horizontal length different from each other in side view. At least one main beam among the main beams includes a plurality of fastening points that are arranged along a longitudinal direction of the at least one main beam. The container having the frame structure is referred to as a chassis. The fastening points are used to fix bolts for attaching the fuel cell module to another structure. In mounting the fuel cell module in the structure, fastening points suitable for the structure can be selected from among the fastening points to fix the fuel cell module to the structure. The fuel cell module disclosed in the present specification is easily fixed to the structure. A type of the fastening points is nuts welded to the main beams. The fastening points may be provided on each of different surfaces of the container.

In the fuel cell module according to the aspect of the present disclosure, the fastening points may be provided on each of different surfaces of the container.

In the fuel cell module according to the aspect of the present disclosure, the at least one main beam may extend along a first direction, and half or more of the fastening points may be disposed between both ends of the fuel cell stack in the first direction.

In the fuel cell module according to the aspect of the present disclosure, the container may include a reinforcing beam that connects different main beams among the plurality of main beams.

In the fuel cell module according to the aspect of the present disclosure, the container may include a reinforcing beam that connects different main beams among the plurality of main beams, the at least one main beam may extend along a first direction, the container may include three or more beams that extend along a second direction perpendicular to the first direction, and the fuel cell stack may be disposed between two adjacent beams among the three or more beams.

In the fuel cell module according to the aspect of the present disclosure, the container may include a reinforcing beam that connects different main beams among the plurality of main beams, and a point where an extension line of the reinforcing beam crosses the main beam may be positioned between the adjacent fastening points.

The fuel cell module according to the aspect of the present disclosure may further include a controller that is housed in the container and is configured to control the fuel cell stack, and the controller may be fixed to the container through a block made of the same first metal as a casing of the controller.

In the fuel cell module according to the aspect of the present disclosure, the controller may be a second heaviest part next to the fuel cell stack among parts housed in the container.

The fuel cell module according to the aspect of the present disclosure may further include an air compressor that is housed in the container and is configured to supply air to the fuel cell stack, and the controller may be a third heaviest part next to the fuel cell stack and the air compressor among parts housed in the container.

In the fuel cell module according to the aspect of the present disclosure, the controller may be fixed to the container by the block and a plate made of second metal different from the first metal.

In the fuel cell module according to the aspect of the present disclosure, the fastening points may be nuts welded to the main beam.

The aspect of the present disclosure will be described in "DETAILED DESCRIPTION OF EMBODIMENTS" described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a top view of the fuel cell module;

FIG. 9 is a sectional view taken along the line IX-IX of FIG. 8;

DETAILED DESCRIPTION OF EMBODIMENTS

First Example

Figure 1:
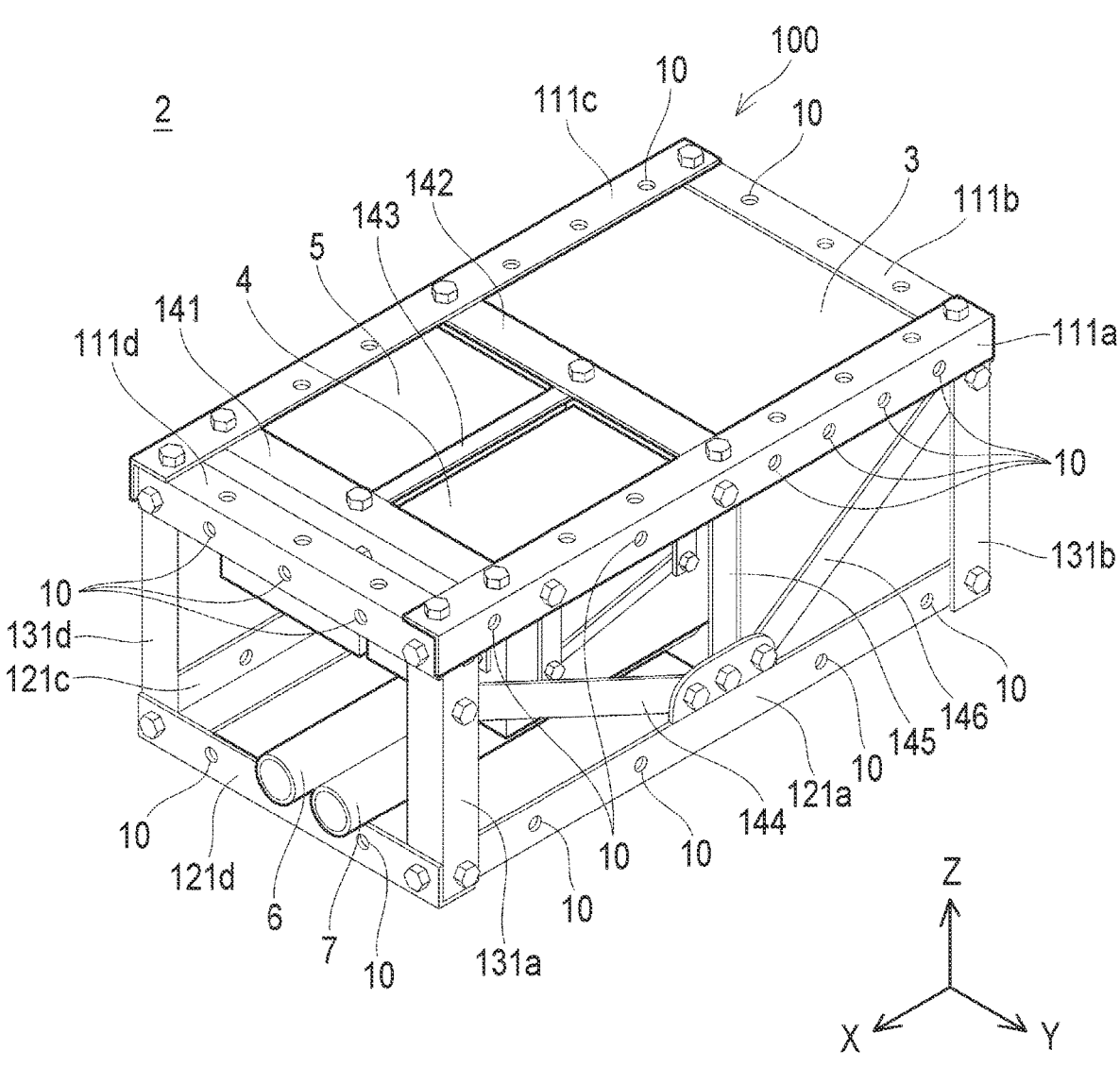
FIG. 1 is a perspective view of a fuel cell module of a first example.
Figures 2, 3:
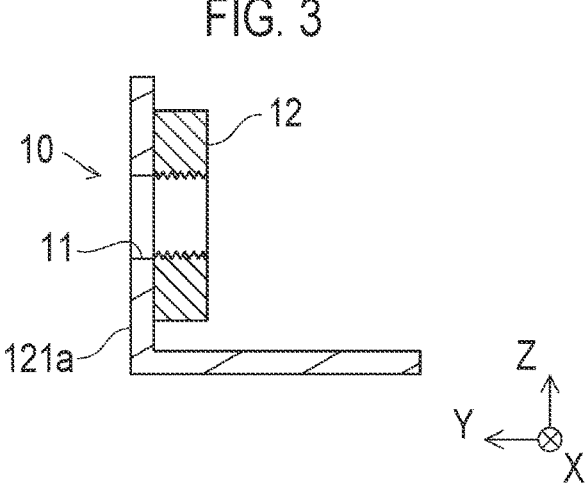
FIG. 2 is a side view of the fuel cell module.
FIG. 3 is a sectional view of a main beam taken along a broken line III of FIG. 2.

A fuel cell module 2 of a first example will be described with reference to the drawings. FIG. 1 is a perspective view of the fuel cell module 2. FIG. 2 is a side view of the fuel cell module 2. For convenience of description, a +X direction of a coordinate system in the drawings is defined as front, and a +Z direction is defined as up. A Y direction is defined as side. Hereinafter, for convenience of description, a "fuel cell" is written as "FC".

The FC module 2 (fuel cell module 2) has a rectangular parallelepiped container 100, and various devices are housed in the container 100. Principal devices that are housed in the container 100 include an FC stack 3, a power control unit 4, and a compressor 5. Although other devices are housed in the container 100, the present example is focused on the disposition of the principal devices, and other devices are not shown. Among the devices included in the container 100, the FC stack 3 is the heaviest, and the power control unit 4 is the second heaviest. Alternatively, the power control unit 4 may be the third heaviest next to the FC stack 3 and the compressor 5.

Two pipes 6, 7 extend forward (+X direction) from the FC stack 3. The pipes 6, 7 supply and discharges fuel gas (or air or coolant) to and from the FC stack 3. The power control unit 4 controls the FC stack and controls output power of the FC stack 3. Specifically, the power control unit 4 is a power conversion device that changes a voltage of power (direct-current power) generated by the FC stack 3 or changes direct-current power to alternating-current power. The compressor 5 sends air (oxygen) to the FC stack 3. A pipe that is connected to the compressor 5 is not shown. Devices needed for operating the FC stack 3 are collectively referred to as accessories, and the power control unit 4 and the compressor 5 are one of accessories.

The overall shape of the container 100 is a rectangular parallelepiped. The container 100 has a frame structure in which a polyhedron is composed of a plurality of main beams. The container 100 includes main beams 111a to 111d, 121a to 121d, 131a to 131d corresponding to 12 sides of the rectangular parallelepiped, and reinforcing beams 141 to 146 that connect adjacent main beams. Among the main beams, main beams corresponding to four sides of an upper surface of the rectangular parallelepiped are referred to as upper main beams 111a to 111d. Among the main beams, main beams corresponding to four sides of a lower surface of the rectangular parallelepiped are referred to as lower main beams 121a to 121d. In FIG. 1, the lower main beams 121b, 121c are invisible behind other devices. Among the main beams, main beams corresponding to four sides of the vertical of the rectangular parallelepiped are referred to as vertical main beams 131a to 131d. In FIG. 1, the vertical main beam 131c is invisible behind other devices.

For convenience of description, a portion composed of the main beams and the reinforcing beams disposed on the upper surface of the container 100 is referred to as an upper frame 110, and a portion composed of other main beams and reinforcing beams is referred to as a lower frame 120. Adjacent main beams are connected by bolts. The reinforcing beams 141 to 146 increase the strength of the frame structure of the rectangular parallelepiped composed of the main beams. Hereinafter, the main beams and the reinforcing beams may be collectively and simply referred to as "beams".

As shown in FIG. 2, the container 100 of the FC module 2 has a vertical length HL and a horizontal length WL different from each other. The horizontal length WL is longer than the vertical length HL.

Fastening points 10 are provided in several main beams. In FIG. 1, a reference sign 10 is attached to several fastening points among a plurality of fastening points 10 provided in the upper surface of the container 100. A cross section of the main beam 121a taken along a broken line III of FIG. 2 is shown in FIG. 3. FIG. 3 shows a cross section of the fastening point 10. As shown in FIG. 3, the main beam 121a is made of an L-shaped steel material. Other main beams are also made of an L-shaped steel material.

The fastening point 10 is composed of a hole 11 provided in the main beam 121a, and a nut 12 fixed to the main beam 121a to be concentric with the hole 11. The nut 12 is welded to the main beam 121a. Although the container 100 includes the fastening points 10, all fastening points 10 have the structure of FIG. 3. The fastening points 10 are provided in any main beams.

The FC module 2 is mounted in a structure, such as an automobile. The fastening points 10 are used to fix the FC module 2 to the structure. The container 100 of the FC module 2 includes the fastening points 10, whereby it is possible to select appropriate fastening points 10 from among the fastening points 10 conforming to a shape or a size of the structure, and to fix the FC module 2 to the structure using the selected fastening points 10. The FC module 2 of the example is easily fixed to the structure.

As shown in FIG. 1, the fastening points 10 are provided in each of a front surface, a left side surface, and the upper surface of the container 100. In FIG. 1, the reference sign 10 is omitted for several fastening points among the fastening points provided in the upper surface. A plurality of fastening points 10 is provided in each of a rear surface, a right side surface, and the lower surface that is invisible in FIG. 1.

A length WSL shown in FIG. 2 indicates the length of the FC stack 3 in an X direction. A reference sign A1 indicates a left end of the FC stack 3 in the X direction, and a reference sign A2 indicates a right end of the FC stack 3 in the X direction. The main beam 111a includes six fastening points 10 arranged in the X direction. Among the six fastening points 10, four fastening points 10 on a right side are disposed between both ends (position A1 and position A2) of the FC stack 3 in the X direction. The main beam 111a has the six fastening points 10, and the four fastening points 10 more than half among the six fastening points 10 are disposed between both ends of the FC stack 3 in the X direction. Similarly, six fastening points are also provided in the main beam 111c on an opposite side.

The FC stack 3 has the heaviest among the devices housed in the container 100. A large number of fastening point 10 are disposed around the heavy FC stack 3, whereby it is possible to stably fix the FC module 2 to the structure.

A one-dot chain line L1 in FIG. 2 is an extension line of the reinforcing beam 144 in a longitudinal direction. A cross point P1 of the extension line (one-dot chain line L1) of the reinforcing beam 144 and the main beam 121a to which the reinforcing beam 144 is connected is positioned between adjacent fastening points 10 in the main beam 121. A one-dot chain line L2 in FIG. 2 is an extension line of the reinforcing beam 146 in a longitudinal direction. A cross point P2 of the extension line (one-dot chain line L2) of the reinforcing beam 146 and the main beam 121$a$ to which the reinforcing beam 146 is connected is also positioned between adjacent fastening points 10.

The points P1, P2 where the extension lines of the reinforcing beams 144, 146 cross the main beam 121$a$ are positioned between adjacent fastening points 10. With this structure, the reinforcing beams 144, 146 firmly reinforce the frame structure of the container 100.

Figure 4:
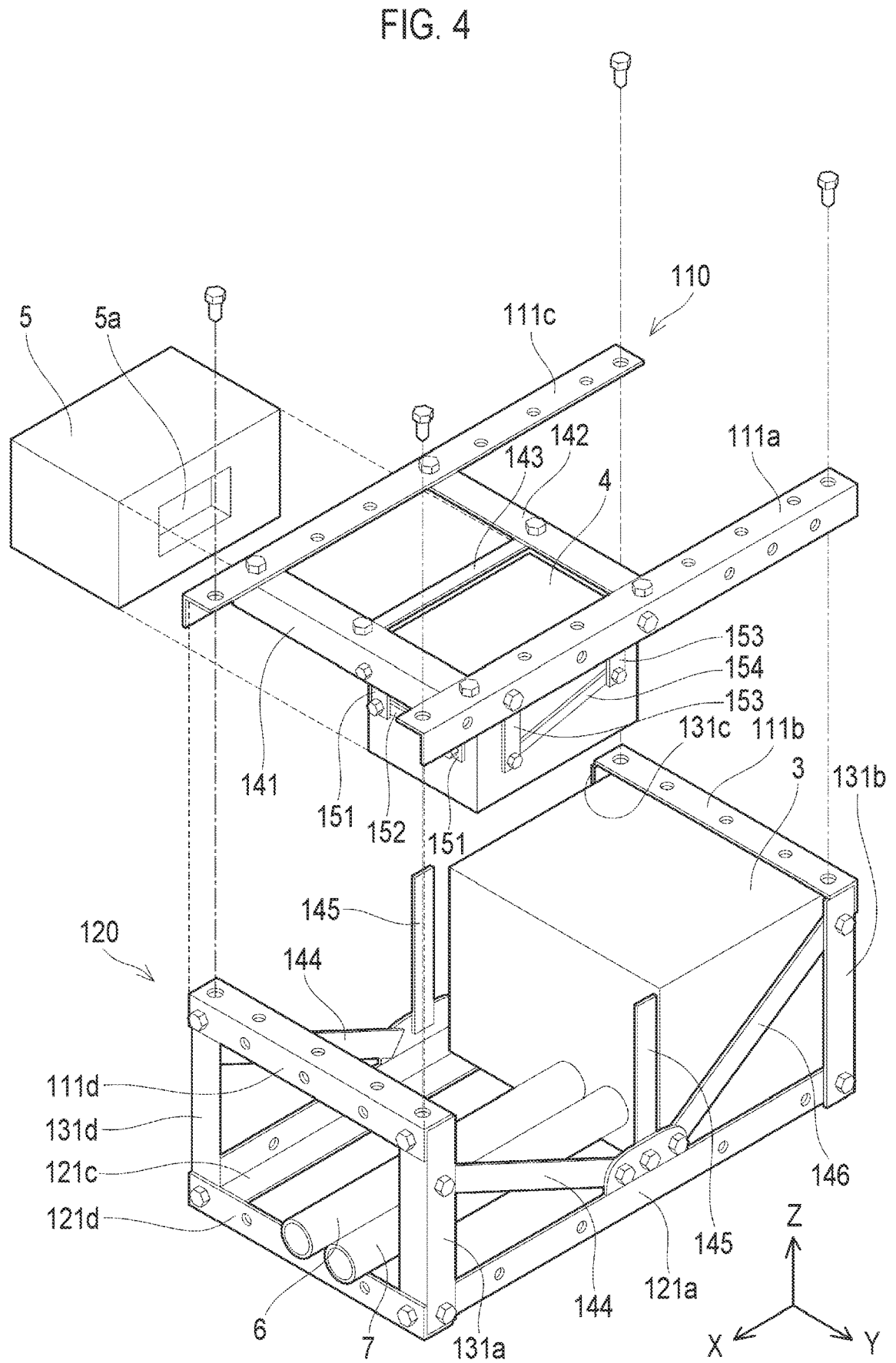
FIG. 4 is an exploded perspective view of the fuel cell module.
Figure 5:
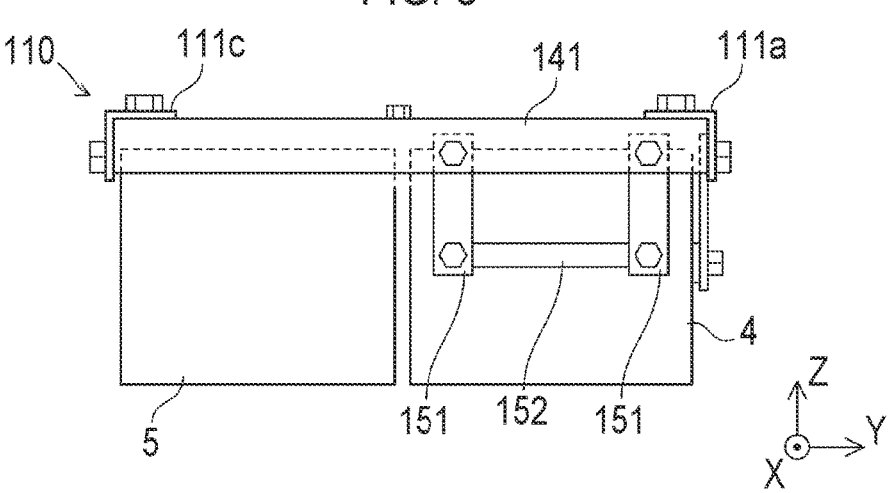
FIG. 5 is a front view of an upper frame shown in FIG. 4.

An exploded perspective view in which the container 100 is vertically divided into two parts is shown in FIG. 4. In FIG. 4, the reference sign 10 is not attached to the fastening points. In FIG. 5 and subsequent drawings, the fastening points 10 are not shown to assist understanding. While FIG. 4 is an exploded perspective view in a state in which the upper frame 110 is separated from the lower frame 120, the upper main beams 111$b$, 111$d$ included in the upper frame 110 are shown in a state of being separated from the upper frame 110 and connected to the lower frame 120. The FC stack 3 is fixed to the lower frame 120. The power control unit 4 and the compressor 5 are suspended from the upper frame 110. Then, the pipes 6, 7 pass below the power control unit 4.

Figure 6:
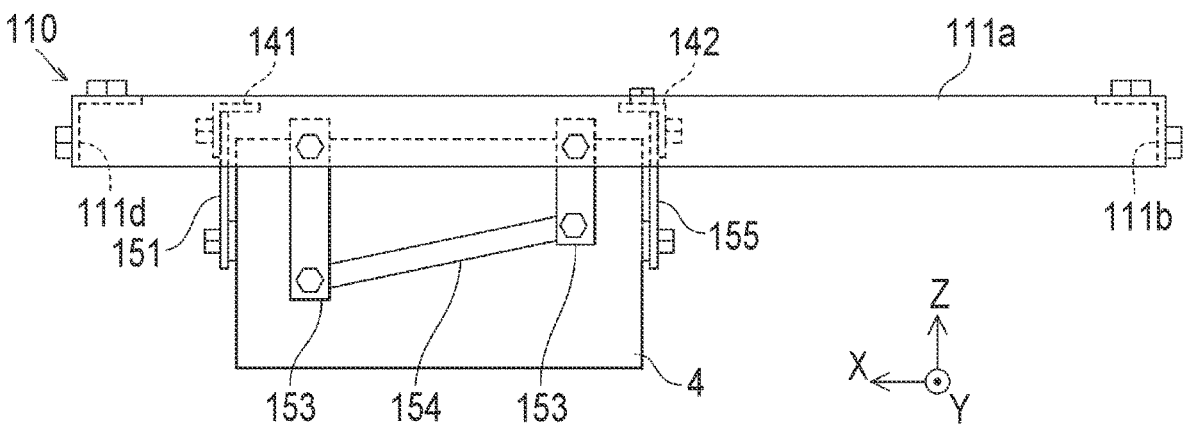
FIG. 6 is a side view of the upper frame shown in FIG. 4.
Figure 7:
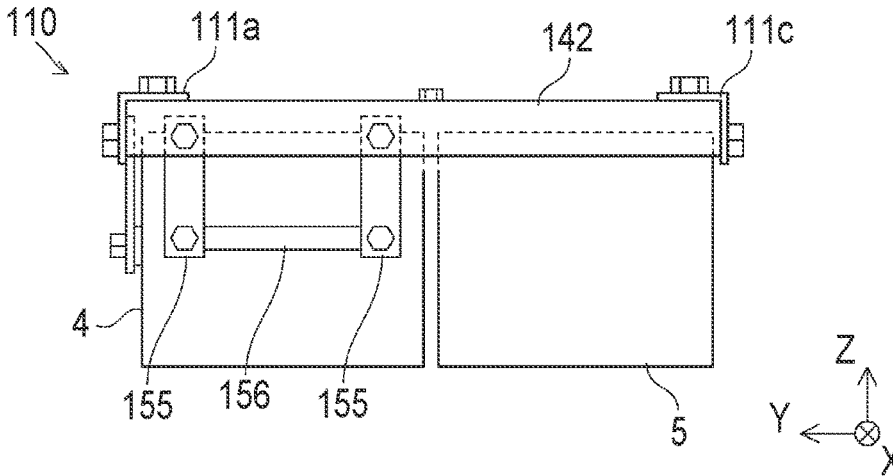
FIG. 7 is a rear view of the upper frame shown in FIG. 4.

The power control unit 4 is suspended from the upper frame 110 by a plurality of brackets 151, 153, and the like. In other words, the power control unit 4 is suspended from the upper frame 110 by the brackets 151, 153, and the like. The brackets 151, 153, and the like are made of a metal plate, and are metal fittings that fix the devices (the power control unit 4 and the like) to the container 100 (the upper frame 110 or the lower frame 120). A front view, a side view, and a rear view showing the upper frame 110 shown in FIG. 4 are shown in FIGS. 5 to 7. FIG. 5 is the front view, FIG. 6 is the side view, and FIG. 7 is the rear view. The compressor 5 is suspended from the upper frame 110 along with the power control unit 4. In FIGS. 5 and 7, a drawing where the upper main beams 111$b$, 111$d$ are removed from the upper frame 110 to facilitate understanding is shown. Therefore, in FIG. 5, the reinforcing beam 141 that connects a pair of parallel upper main beams 111$a$, 111$c$ is visible on the front. In FIG. 7, the reinforcing beam 142 that connects the parallel upper main beams 111$a$, 111$c$ is visible on the front.

As shown in FIGS. 5 to 7, the power control unit 4 is suspended from the upper frame 110 by the brackets 151 to 156. The two brackets 151 connect a front surface of the power control unit 4 to the reinforcing beam 141 of the upper frame 110, and the bracket 152 connects the two brackets 151 (FIG. 5). Since the bracket 152 that extends in a horizontal direction (Y direction) connects the two brackets 151 that extend in parallel in a vertical direction, the brackets 151, 152 suppress shaking in the horizontal direction (Y direction) of the power control unit 4.

Two brackets 155 connect a rear surface of the power control unit 4 to the reinforcing beam 142 of the upper frame 110, and the bracket 156 connects the two brackets 155 (FIG. 7). Since the bracket 156 that extends in the horizontal direction (Y direction) connects the two brackets 155 that extend in parallel in the vertical direction, the brackets 155, 156 suppress shaking in the horizontal direction (Y direction) of the power control unit 4.

The two brackets 153 connect a side surface of the power control unit 4 to the upper main beam 111$a$ of the upper frame 110, and the bracket 154 connects the two brackets 153 (FIG. 6). Since the bracket 154 that extends in a front-rear direction (X direction) connects the two brackets 153 that extends in parallel in the vertical direction, the brackets 153, 154 suppress shaking in the front-rear direction (X direction) of the power control unit 4.

The brackets 151, 152 (153, 154 and 155, 156) are connected to the main beam or the reinforcing beam by bolts. The brackets may be welded to the main beam or the reinforcing beam. The compressor 5 is also suspended from the upper frame 110 through the brackets.

Figures 8, 9:
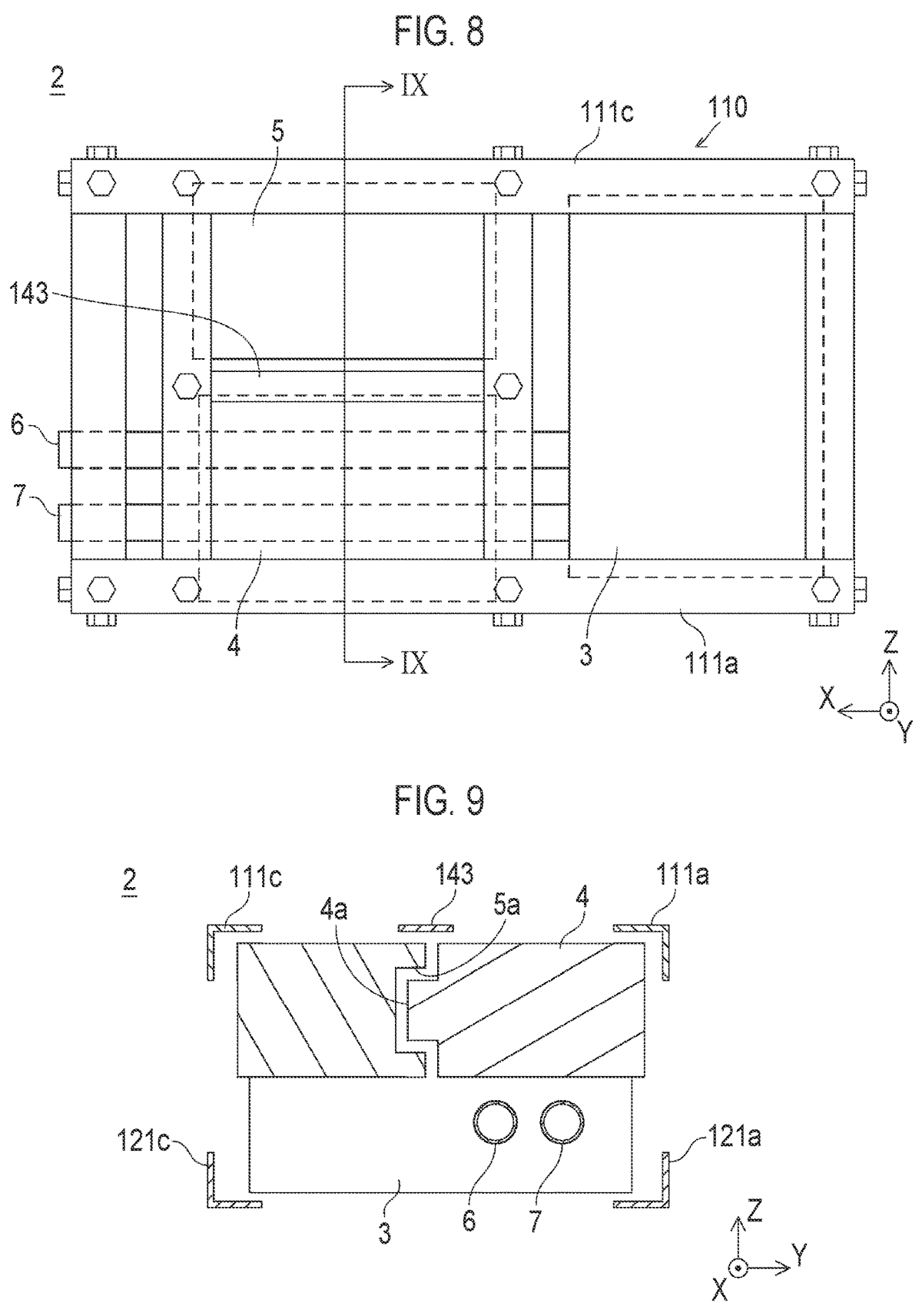

As shown in FIG. 4, the compressor 5 has a recess portion (hollow) 5$a$ in a surface facing the power control unit 4. A top view of the FC module 2 is shown in FIG. 8, and a cross section taken along the line IX-IX of FIG. 8 is shown in FIG. 9. FIG. 9 shows a cross section crossing the recess portion 5$a$ of the compressor 5. As shown in FIG. 9, a protrusion portion 4$a$ is provided in a surface of the power control unit 4 facing the compressor 5, and the power control unit 4 and the compressor 5 are disposed such that the protrusion portion 4$a$ and the recess portion 5$a$ are fitted.

Several features and advantages of the fuel cell module 2 of the first example will be listed below. The container 100 has a frame structure, and includes the 12 main beams 111$a$ to 111$d$, 121$a$ to 121$d$, 131$a$ to 131$d$ corresponding to the respective sides of the rectangular parallelepiped, and the reinforcing beams 141 to 146 that connect adjacent main beams. The container 100 has the vertical length and the horizontal length different from each other in side view. At least one main beam (main beam 111$a$) has the fastening points 10 that are arranged along the longitudinal direction (X direction) of the main beam 111$a$. The fastening points 10 are provided in each of different surfaces of the container 100. The fastening points 10 are provided, whereby it is convenient for fixing the FC module 2 to the structure.

At least one main beam (main beam 111$a$) extends in the X direction, and half or more of the fastening points 10 are disposed between both ends of the FC stack 3 in the X direction.

The point P1 (P2) where the extension line L1 (L2) of the reinforcing beam 144 (146) crosses the main beam 121$a$ is positioned between adjacent fastening points 10. The adjacent fastening points 10 do not deteriorate the strength of the reinforcing beams 144, 146.

The power control unit 4 is suspended from the upper frame 110, and the piping (pipes 6, 7) of the FC stack 3 passes below the power control unit 4. With this structure, it is possible to accommodate the power control unit 4 in the container 100 with satisfactory space efficiency. In a case where the power control unit 4 is disposed on the lower surface of the container 100, and the piping passes above the power control unit 4, the piping is bent, space efficiency is deteriorated, and a pressure loss of a fluid flowing in the piping increases.

The compressor 5 is disposed on a side of the power control unit 4. The recess portion 5$a$ is provided in the surface of the compressor 5 facing the power control unit 4. The protrusion portion 4$a$ is provided in the surface of the power control unit 4 facing the compressor 5. The power control unit 4 and the compressor 5 are disposed such that the protrusion portion 4$a$ and the recess portion 5$a$ are fitted. With this structure, it is possible to accommodate the power control unit 4 and the compressor 5 in the container 100 having the frame structure with satisfactory space efficiency.

The recess portion 5$a$ and the protrusion portion 4$a$ may be reversed. Instead of the compressor 5, another accessory may be disposed on the side of the power control unit 4. In this case, a recess portion may be provided in one of the power control unit 4 and another accessory, a protrusion portion may be provided in the other one of the power control unit 4 and another accessory, and the power control unit 4 and another accessory may be disposed in the container 100 such that the recess portion and the protrusion portion are fitted. Another accessory is also suspended from the upper frame 110.

The reinforcing beam 145 extends in parallel with the vertical main beams 131*a* to 131*d*. The reinforcing beam 145 and the vertical main beams 131*a*, 131*b* are connected to the lower main beam 121*a*. The lower main beam 121*a* extends in the X direction (first direction), and the vertical main beams 131*a*, 131*b* and the reinforcing beam 145 extend in the Y direction (second direction) perpendicular to the X direction. The FC stack 3 is disposed between the vertical main beam 131*b* and the reinforcing beam 145.

The above-described feature can be expressed as follows in a case where the vertical main beams 131*a*, 131*b* and the reinforcing beam 145 are collectively and generically referred to as "beams". The container (100) includes the reinforcing beam (145) that connects different main beams (111*a*, 121*a*). At least one main beam (121*a*) extends along the first direction (X direction). The container (100) includes three or more beams (main beams 131*a*, 131*b*, and reinforcing beam 145) that extend along the second direction (Y direction) perpendicular to the first direction. The FC stack 3 is disposed between two adjacent beams (main beam 131*b* and reinforcing beam 145) among the three or more beams (main beams 131*a*, 131*b* and reinforcing beam 145).

According to the above-described feature, a large number of beams (main beams or reinforcing beams) are disposed in the vicinity of the FC stack 3 that is a heavy part, whereby the container 100 enables reliable protection of the FC stack 3. A container 400 (FIG. 15) described below also has the same feature.

Second Example

Figure 10:
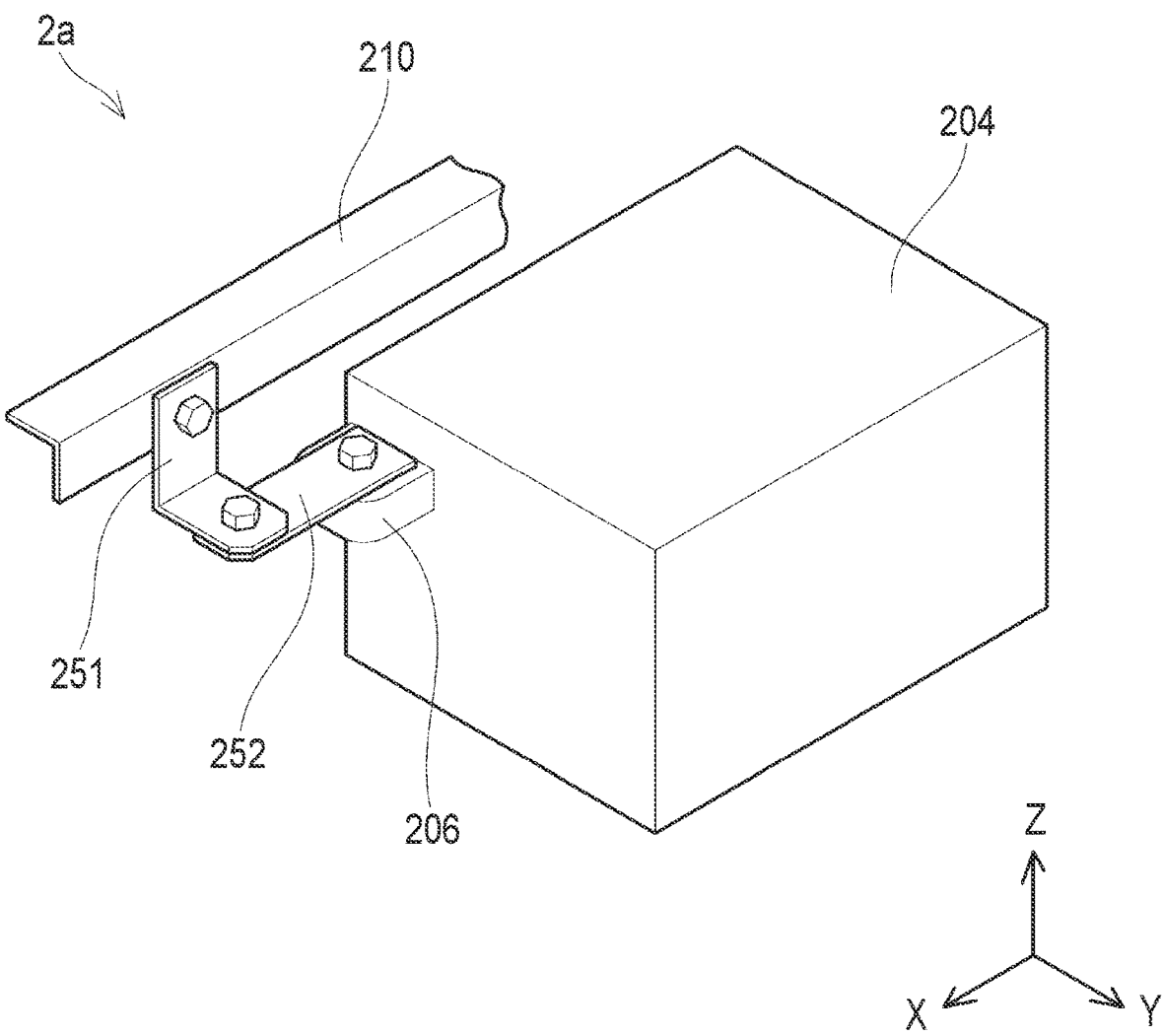
FIG. 10 is an enlarged perspective view of the vicinity of a bracket in a fuel cell module of a second example.
Figure 11:
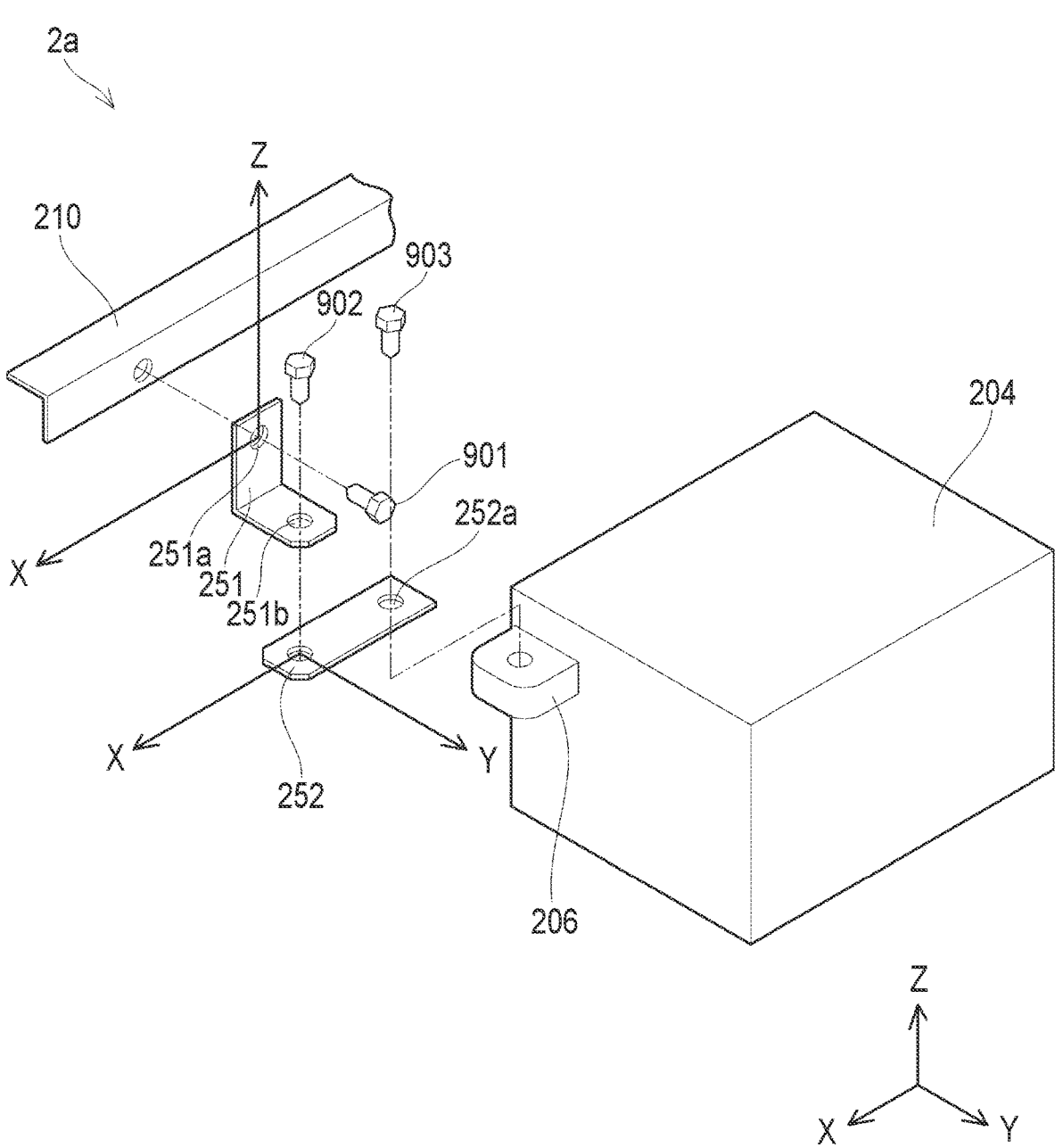
FIG. 11 is an exploded view of FIG. 10.

A partial perspective view of an FC module 2*a* of a second example is shown in FIGS. 10 and 11. FIG. 10 is an enlarged view of the vicinity of brackets (first bracket 251 and second bracket 252) that suspend a power control unit 204 from an upper frame 210. FIG. 11 is an exploded view of FIG. 10. While the power control unit 204 is suspended from the upper frame 210 by different brackets in addition to the first bracket 251 and the second bracket 252, different brackets are not shown.

A container of the FC module 2*a* also has a frame structure like the FC module 2 of the first example. The container is composed of main beams 111*a* to 111*d*, 121*a* to 121*d*, 131*a* to 131*d* corresponding to 12 sides of a rectangular parallelepiped, and a plurality of reinforcing beams that connect adjacent main beams.

The first bracket 251 is bent in an L-shape, and the second bracket 252 has a flat plate shape. A bolt 901 passes through a first hole 251*a* provided at a first end of the first bracket 251, and the bolt 901 is fixed to the upper frame 210. The first bracket 251 is connected to the upper frame 210 by the bolt 901. A bolt 902 passes through a second hole 251*b* provided at a second end of the first bracket 251, and the bolt 902 is connected to the second bracket 252. The first bracket 251 is connected to the second bracket 252 by the bolt 902. A bolt 903 passes through a hole 252*a* provided at a first end of the second bracket 252, and the bolt 903 is fixed to a tab 206 of the power control unit 204.

A diameter of the first hole 251*a* with an axis of the hole extending in the Y direction is greater than a diameter of the bolt 901. Therefore, the first bracket 251 can move within an XZ plane with respect to the upper frame 210. That is, a position of the first bracket 251 with respect to the upper frame 210 can be adjusted within the XZ plane.

A diameter of the second hole 251*b* with an axis of the hole extending in the Z direction is greater than a diameter of the bolt 902. Therefore, the second bracket 252 can move within an XY plane with respect to the first bracket 251. That is, a position of the second bracket 252 with respect to the first bracket 251 can be adjusted within the XY plane. The XY plane is a plane perpendicular to the XZ plane.

A position of the power control unit 204 that is suspended from the upper frame 210 can be adjusted in a direction of each of XYZ by the first bracket 251 and the second bracket 252. In particular, both the first hole 251*a* and the second hole 251*b* can adjust a position of the power control unit 204 in the X direction. Therefore, the power control unit 204 has a large adjustment width in the X direction. The X direction corresponds to the longitudinal direction of the rectangular upper frame 210. That is, in the position adjustment of the power control unit 204 that is suspended from the upper frame 210 through the first bracket 251 and the second bracket 252, an adjustment range in the longitudinal direction is greater than an adjustment range in a transverse direction.

Figure 12:
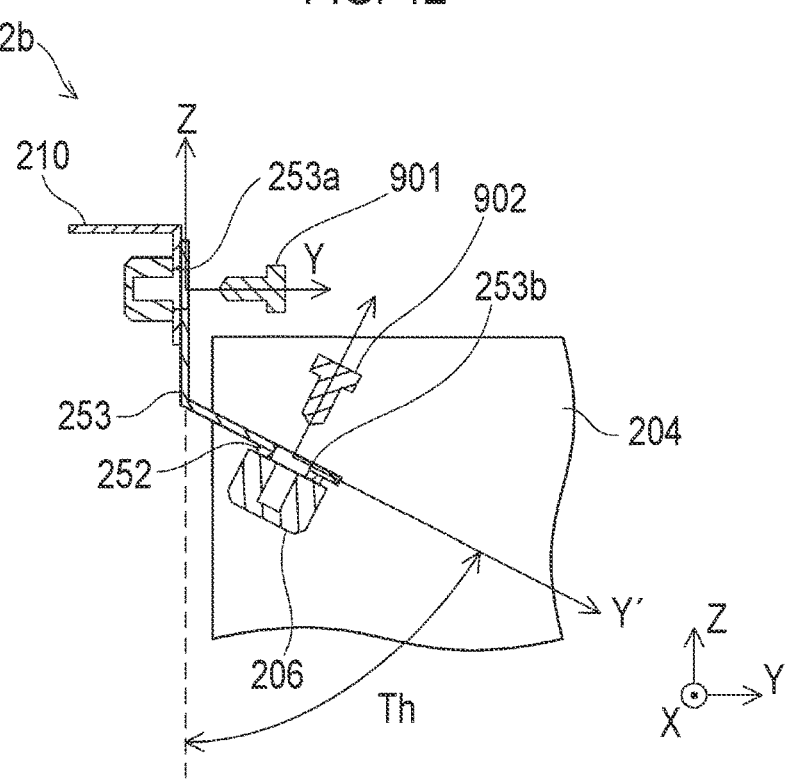
FIG. 12 is a sectional view of an FC module.

An FC module 2*b* using a modification example (first bracket 253) of the first bracket will be described with reference to FIG. 12. FIG. 12 is a sectional view of the FC module 2*b* taken along a plane that passes through a first hole 253*a* and a second hole 253*b* of the first bracket 253 and is parallel to a YZ plane.

The first hole 253*a* is directed toward the Y direction like the first hole 251*a* of the first bracket 251. Accordingly, the power control unit 204 can move within the XZ plane with respect to the upper frame 210 by clearances of the first hole 253*a* and the bolt 901.

On the other hand, the first bracket 253 is bent at an angle Th smaller than a right angle. An opening surface (XY' plane) of the second hole 253*b* is inclined by the angle Th with respect to the Z axis. Therefore, the power control unit 204 can move within the XY' plane with respect to the upper frame 210 by clearances of the second hole 253*b* and the bolt 902.

In the FC module 2*a* or 2*b* of the second example, it is easy to perform fine adjustment of the position of the power control unit 204 in the frame.

Third Example

Figure 13:
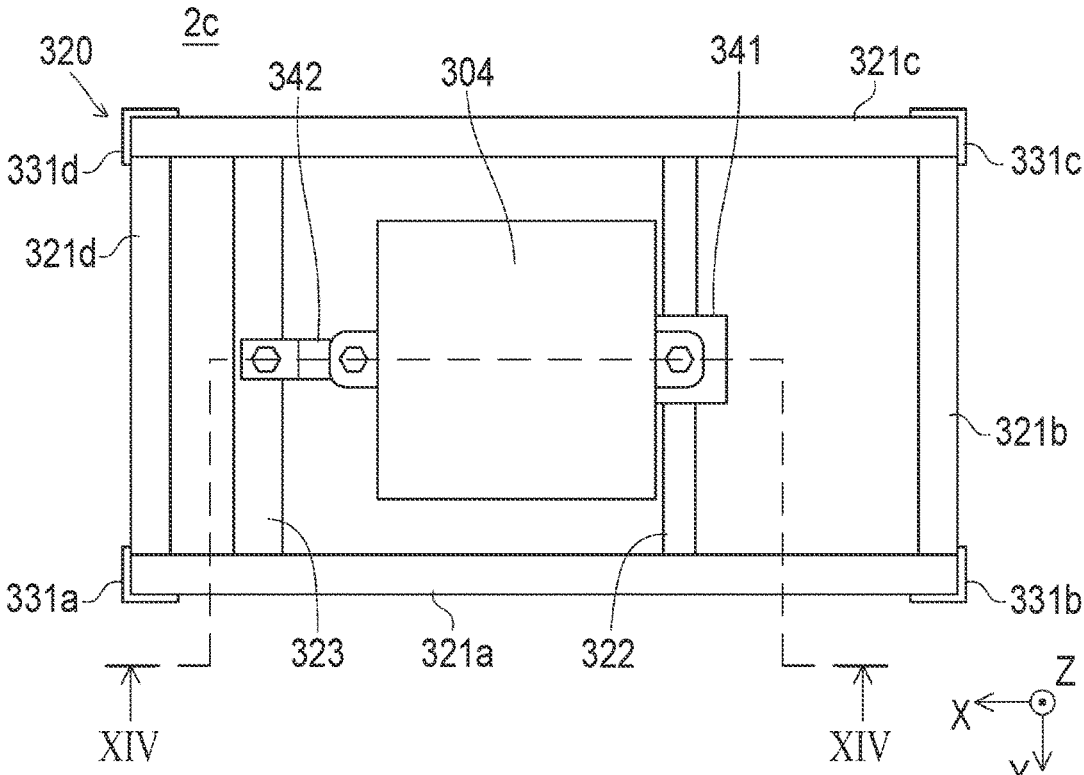
FIG. 13 is a plan view of a lower frame of the FC module.
Figure 14:
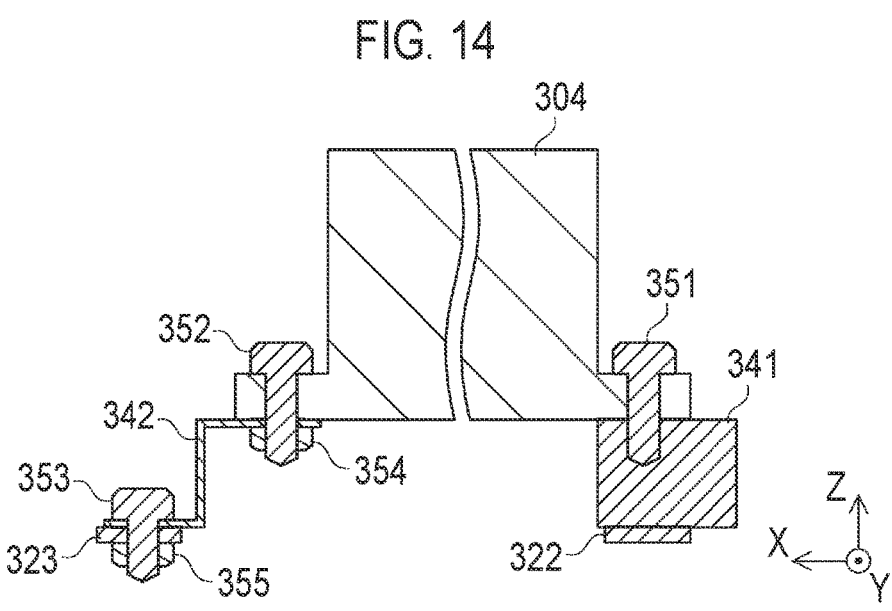
FIG. 14 is a sectional view of the lower frame taken along the line XIV-XIV of FIG. 13.

An FC module 2*c* of a third example will be described with reference to FIGS. 13 and 14. FIG. 13 is a plan view of a lower frame 320 of the FC module 2*c*. FIG. 14 is a sectional view of the lower frame 320 taken along the line XIV-XIV of FIG. 13.

The lower frame 320 is composed of four lower main beams 321*a* to 321*d* corresponding to four sides of the bottom of the container, four vertical main beams 331*a* to 331*d*, and reinforcing beams 322, 323. The reinforcing beams 322, 323 connect a pair of parallel lower main beams 321*a*, 321*c*.

In the FC module 2*c* of the third example, a power control unit 304 is fixed to the lower frame 320. In FIG. 13, an FC stack that is fixed to the lower frame 320 is not shown.

The power control unit 304 is fixed to the reinforcing beams 322, 323 of the lower frame 320 through a metal block 341 and a bracket 342. The metal block 341 is made of the same first metal (aluminum) as a casing of the power control unit 304. The metal block 341 is fixed to the reinforcing beam 322, and the power control unit 304 is fixed to the metal block 341 by a bolt 351.

The bracket 342 is made of an iron plate. In other words, the bracket 342 is made of second metal different from the metal block 341. A first end of the bracket 342 is fixed to the power control unit 304 by a bolt 352 and a nut 354. A second end of the bracket 342 is fixed to the reinforcing beam 323 by a bolt 353 and a nut 355.

Advantages of the structure of the FC module 2c of the third example will be described. The power control unit 304 is fixed to the lower frame 320 through the metal block 341. The power control unit 304 is the second heaviest after the FC stack 3 among parts of the FC module 2c. Alternatively, the power control unit 304 is the third heaviest next to the FC stack 3 and the compressor 5. The metal block 341 can firmly support the heavy power control unit 304. With this structure, the power control unit 304 is difficult to vibrate.

The power control unit 304 is fixed to the lower frame 320 through the bracket 342. The bracket 342 has low rigidity compared to the metal block 341. With this structure, even though there is a gap between the power control unit 304 and the bracket 342 before being fixed by a bolt, the bracket 342 is deformed to narrow the gap. The bracket 342 is deformed, whereby it is possible to absorb misalignment of the power control unit 304 and the lower frame 320.

Fourth Example

Figure 15:
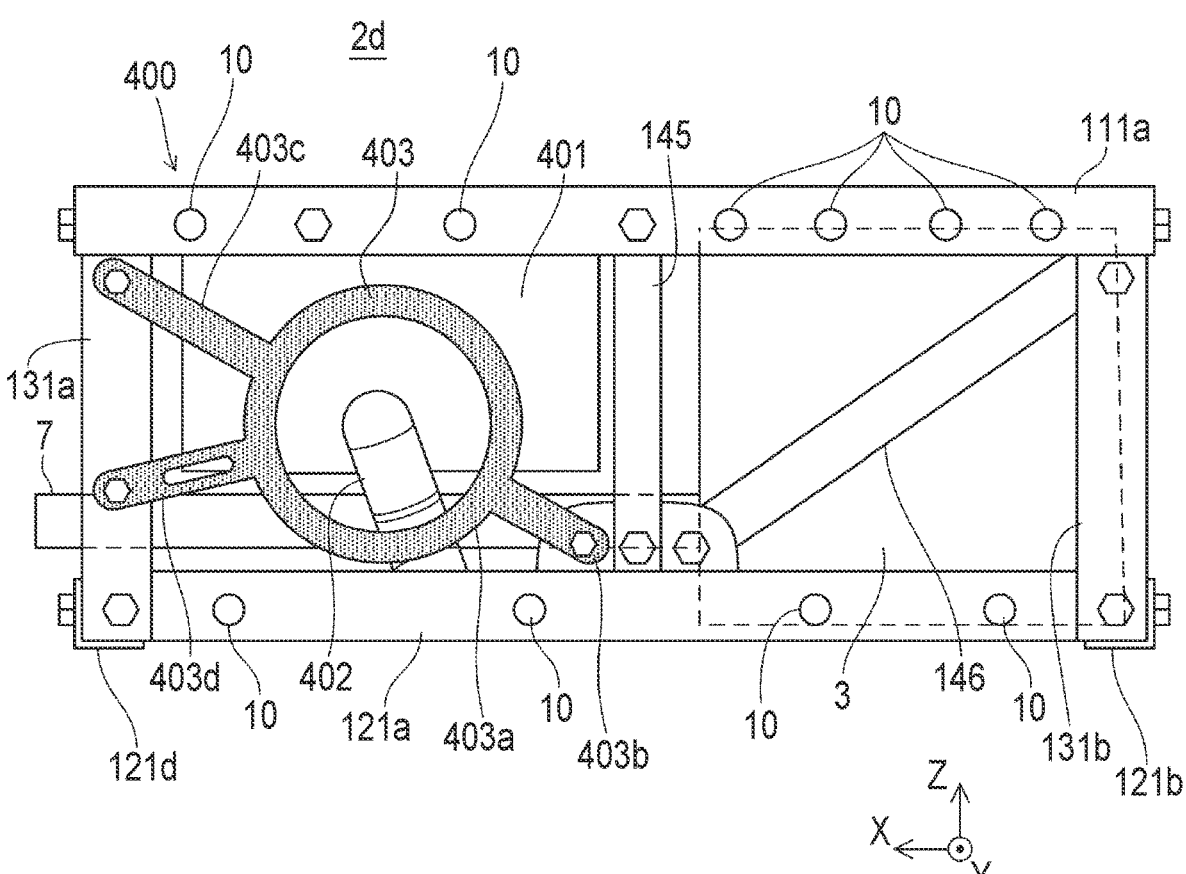
FIG. 15 is a side view of an FC module of a fourth example.

An FC module 2d of a fourth example will be described with reference to FIG. 15. FIG. 15 is a side view of the FC module 2d. The FC module 2d includes a container 400. The container 400 is a rectangular parallelepiped having a frame structure, and houses the FC stack 3 and a compressor 401.

The container 400 includes an upper main beam 111a, lower main beams 121a, 121b, 121d, vertical main beams 131a, 131b, and three reinforcing beams 145, 146, 403. In FIG. 15, other main beams and reinforcing beams are invisible.

The reinforcing beam 403 connects the lower main beam 121a and the left vertical main beam 131a. The reinforcing beam 403 is composed of a ring-shaped central portion 403a, and three arms 403b, 403c, 403d. The three arms 403b to 403d extend radially from the central portion 403a. A tip of the arm 403b is fixed to the lower main beam 121a by a bolt. A tip of the arm 403c and a tip of the arm 403d are fixed to the vertical main beam 131a by bolts.

A pipe 402 protrudes from a side surface of the compressor 401, and an upper end of the pipe 402 is positioned inside the ring of the central portion 403a. The reinforcing beam 403 has the ring-shaped central portion 403a to avoid interference with the pipe 402.

The FC module 2 disclosed in the present specification includes the FC stack 3, the power control unit 4 that controls the output power of the FC stack 3, and the container 100 that houses the FC stack 3 and the power control unit 4. The container 100 has a frame structure, and is divided into the upper frame 110 and the lower frame 120. The power control unit 4 is suspended from the upper frame 110, and the pipes 6, 7 that are connected to the FC stack 3 pass below the power control unit 4. The FC module 2 suspends the power control unit 4 from the upper frame 110 to secure a space below the power control unit 4, and the pipes 6, 7 of the FC stack 3 pass through the space. The FC module 2 accommodates the FC stack 3, the pipes 6, 7, and the power control unit 4 in the container 100 with satisfactory space efficiency.

The power control unit 4 is suspended from the upper frame 110 through a plurality of brackets. In particular, the brackets include a first bracket 251 and a second bracket 252 having the following features. The first bracket 251 has a first end that is connected to the upper frame 110. The second bracket 252 has a first end that is connected to a second end of the first bracket 251, and a second end that is connected to the power control unit 4. An attachment position of the first bracket 251 to the upper frame 110 can be adjusted within a first plane (within the XZ plane), and an attachment position of the second bracket 252 to the first bracket 251 can be adjusted within a second plane (within the XY plane) perpendicular to the first plane. With the combination of the first bracket 251 and the second bracket 252, it is possible to perform fine adjustment of the position of the power control unit 4 in the container.

An accessory is disposed next to the power control unit 4, a protrusion portion is provided in one of the power control unit 4 and the accessory, a recess portion is provided in the other one of the power control unit 4 and the accessory, and the power control unit 4 and the accessory are disposed such that the protrusion portion and the recess portion are fitted. The accessory is a generic name of devices needed for operating the FC stack 3, and the compressor 5 that sends air into the FC stack 3 is an example of the accessory. The power control unit 4 and the accessory (compressor 5) are disposed such that the protrusion portion and the recess portion are fitted, whereby space efficiency is further improved.

Points to consider regarding the technique described in the examples will be described. The positions of the reinforcing beams are not limited to the positions illustrated in the examples. The shapes of the reinforcing beams are not limited to the shapes shown in the examples. The power control unit 4, 204, or 304 corresponds to an example of a controller.

Although specific examples of the aspect of the disclosure have been described above in detail, the examples are merely illustrative and are not intended to limit the scope of the claims. The technique described in the claims includes various modifications and alterations of the specific examples illustrated above. The technical elements described in the present specification or the drawings exhibit technical usefulness alone or in various combinations, and are not limited to the combinations described in the claims at the time of filing. The technique illustrated in the present specification or the drawings can achieve a plurality of objectives at the same time, and have technical usefulness by achieving one of the objectives.

What is claimed is:

1. A fuel cell module comprising:

a fuel cell stack;

a container having a frame structure and including a plurality of main beams forming a polyhedron and including a first reinforcing beam, the container housing the fuel cell stack, and the first reinforcing beam connecting a first main beam and a second main beam among the plurality of main beams; and a power control unit housed in the container and configured to control the fuel cell stack, wherein:

the container has a vertical length and a horizontal length different from each other in a side view;

the first main beam includes a plurality of fastening points that are arranged along a longitudinal direction of the first main beam, the fastening points being configured to fix a bolt that attaches the fuel cell module to an automobile;

the fuel cell module is attached to the automobile with the bolt at at least one fastening point of the fastening points; and the power control unit is fixed to the first reinforcing beam.

2. The fuel cell module according to claim 1, wherein:

the first main beam extends along a first direction; and half or more, but less than all, of the fastening points are disposed between both ends of the fuel cell stack in the first direction.

3. The fuel cell module according to claim 1, wherein:

the first main beam extends along a first direction;

the container includes a third main beam and a fourth main beam among the plurality of main beams and a second reinforcing beam each connected to the first main beam;

each of the third main beam, fourth main beam, and second reinforcing beam extend parallel to a second direction perpendicular to the first direction;

the second reinforcing beam is positioned between the third main beam and the fourth main beam in a direction parallel to the first direction; and the fuel cell stack is disposed between the third main beam and the second reinforcing beam when viewed from the side view.

4. The fuel cell module according to claim 1, wherein:

a third reinforcing beam connects the first main beam and a fifth main beam among the plurality of main beams;

the fifth main beam includes a plurality of second fastening points that are arranged along a direction parallel to the longitudinal direction; and a point where an extension line of the third reinforcing beam intersects with the fifth main beam among the plurality of main beams is positioned between adjacent second fastening points among the plurality of second fastening points of the fifth main beam.

5. The fuel cell module according to claim 1, wherein the power control unit is fixed to the container through a block made of a first metal, the first metal being a same metal as a casing of the power control unit.

6. The fuel cell module according to claim 5, wherein the power control unit is a second heaviest component after the fuel cell stack among parts housed in the container.

7. The fuel cell module according to claim 5, further comprising an air compressor that is housed in the container and is configured to supply air to the fuel cell stack, wherein the power control unit is a third heaviest component after the fuel cell stack and the air compressor among parts housed in the container.

8. The fuel cell module according to claim 5, wherein the power control unit is fixed to the container by the block and a plate made of second metal different from the first metal.

9. The fuel cell module according to claim 1, wherein each of the fastening points of the first main beam further include a nut welded to the first main beam.

10. The fuel cell module according to claim 2, wherein:

six fastening points among the plurality of fastening points are arranged along the longitudinal direction of the first main beam; and four of the six fastening points are disposed between the both ends of the fuel cell stack when viewed from the side view.

11. The fuel cell module according to claim 1, wherein:

the power control unit is suspended from the first reinforcing beam by a plurality of brackets;

two brackets among the plurality of brackets connect a surface of the power control unit to the first reinforcing beam; and a third bracket among the plurality of brackets connects the two brackets.

12. The fuel cell module according to claim 1, wherein the power control unit is suspended from the first main beam by a first bracket and a second bracket;

the first bracket is bent in an L-shape;

the second bracket has a flat plate shape;

a first bolt passes through a first hole provided at a first end of the first bracket and fixes the first bracket to the first main beam; and a second bolt passes through a second hole provided at a second end of the first bracket and fixes the first bracket to the second bracket.

13. The fuel cell module according to claim 12, wherein a diameter of the first hole is greater than a diameter of the first bolt, and a diameter of the second hole is greater than a diameter of the second bolt.

14. The fuel cell module according to claim 12, wherein a surface of the first bracket having the second hole is inclined by an angle smaller than a right angle with respect to a vertical direction.

15. The fuel cell module according to claim 1, further comprising a first pipe for supplying fuel gases to the fuel cell stack and a second pipe for discharging gases from the fuel cell stack, wherein:

the first pipe and the second pipe extend within the container in the longitudinal direction, the power control unit is suspended from the first main beam or the first reinforcing beam; and the first pipe and the second pipe pass below the power control unit.

16. The fuel cell module according to claim 1, wherein:

the first main beam is directly connected to a third main beam of the plurality of main beams; and the first main beam, the second main beam, and the third main beam each form a separate edge of the polyhedron.

17. The fuel cell module according to claim 1, wherein each edge of the polyhedron is formed by each main beam of the plurality of main beams.

18. The fuel cell module according to claim 1, wherein the first reinforcing beam traverses a face of the polyhedron.

19. The fuel cell module according to claim 1, wherein at least one of the plurality of fastening points is not used to attach the fuel cell module to the automobile.

20. A fuel cell module comprising:

a fuel cell stack; and a container having a frame structure and including a plurality of main beams forming a polyhedron; wherein:

the container has a vertical length and a horizontal length different from each other in a side view;

the plurality of main beams includes:

a first main beam positioned along a first horizontal axis;

a second main beam positioned along a second horizontal axis substantially parallel to the first horizontal axis; and a third main beam positioned along a first vertical axis substantially perpendicular to the first horizontal axis and directly connected to the first main beam and the second main beam;

the first main beam, the second main beam, and the third main beam each form an edge of the polyhedron;

the first main beam extends beyond the fuel cell stack in a direction along the first horizontal axis when viewed from the side view;

the first main beam includes a plurality of fastening points that are arranged along the first horizontal axis of the first main beam, the fastening points being configured to attach the fuel cell module to an automobile; and at least one of the fastening points is positioned within a region of the first main beam that extends beyond the fuel cell stack in the direction along the first horizontal axis when viewed from the side view.

\* \* \* \* \*